US011976724B2

(12) United States Patent
Takahashi et al.

(10) Patent No.: US 11,976,724 B2
(45) Date of Patent: May 7, 2024

(54) AUTOMATIC TRANSMISSION, CONTROL METHOD FOR AUTOMATIC TRANSMISSION, AND NON-TRANSITORY COMPUTER-READABLE MEDIUM

(71) Applicants: JATCO Ltd, Fuji (JP); NISSAN MOTOR CO., LTD., Yokohama (JP)

(72) Inventors: Seiichirou Takahashi, Isehara (JP); Koji Saito, Machida (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/546,622

(22) PCT Filed: Feb. 15, 2022

(86) PCT No.: PCT/JP2022/005888
§ 371 (c)(1),
(2) Date: Aug. 16, 2023

(87) PCT Pub. No.: WO2022/181388
PCT Pub. Date: Sep. 1, 2022

(65) Prior Publication Data
US 2024/0044404 A1 Feb. 8, 2024

(30) Foreign Application Priority Data

Feb. 25, 2021 (JP) ................. 2021-028935

(51) Int. Cl.
*F16H 61/662* (2006.01)
*F16H 61/14* (2006.01)
*F16H 61/66* (2006.01)

(52) U.S. Cl.
CPC ..... *F16H 61/66259* (2013.01); *F16H 61/143* (2013.01); *F16H 2061/145* (2013.01); *F16H 2061/661* (2013.01)

(58) Field of Classification Search
CPC ............ F16H 61/66259; F16H 61/143; F16H 2061/145; F16H 2061/661
See application file for complete search history.

(56) References Cited

U.S. PATENT DOCUMENTS

2008/0234904 A1* 9/2008 Tawara ............. F16H 61/66259
701/56
2013/0244833 A1* 9/2013 Takamura ......... F16H 61/66259
477/115

(Continued)

FOREIGN PATENT DOCUMENTS

JP 2004-218785 A 8/2004

*Primary Examiner* — Lori Wu
(74) *Attorney, Agent, or Firm* — Foley & Lardner LLP (57) ABSTRACT

[PROBLEMS] When an acceleration request from a driver is large, upshift is performed under a high engine rotation speed.
[SOLUTIONS] Provided is an automatic transmission, including: a torque converter that is disposed downstream of a drive source in a power transmission path and is provided with a lockup clutch; and a transmission mechanism that is disposed downstream of the torque converter and changes a speed ratio between an input shaft and an output shaft, in which in a state where the lockup clutch is engaged, when a rotation speed of the input shaft reaches a first rotation speed, the automatic transmission starts upshift, and in a state where the lockup clutch is disengaged or slips, when the rotation speed of the input shaft reaches a second rotation speed obtained by subtracting a first predetermined rotation speed from the first rotation speed, the automatic transmission starts upshift, and the first predetermined rotation speed decreases as an output torque of the drive source increases.

5 Claims, 8 Drawing Sheets

(56) References Cited

U.S. PATENT DOCUMENTS

2017/0274905 A1\* 9/2017 Sugawara ........... B60W 10/026
2017/0349180 A1\* 12/2017 Honma ............... B60W 10/026
2019/0283759 A1\* 9/2019 Egashira ............... F16H 61/143

\* cited by examiner

FIG.8

US 11,976,724 B2

AUTOMATIC TRANSMISSION, CONTROL METHOD FOR AUTOMATIC TRANSMISSION, AND NON-TRANSITORY COMPUTER-READABLE MEDIUM

TECHNICAL FIELD

The present invention relates to an automatic transmission, a control method for an automatic transmission, and a program.

BACKGROUND ART

Patent Literature 1 discloses a vehicle control device that changes a shift line used for shifting an automatic transmission when a throttle is fully open based on whether an engine rotation speed can be controlled by an engine rotation control unit. In this control device, when the engine rotation speed is controllable, shift is performed with the engine rotation speed being higher than when the engine rotation speed is not controllable.

PRIOR ART DOCUMENT

Patent Literature

Patent Literature 1: JP 2004-218785 A

SUMMARY OF INVENTION

However, when a lockup clutch is disengaged or slips, there is a difference between the engine rotation speed and a rotation speed of an input shaft of a transmission mechanism. Therefore, when performing upshift based on the rotation speed of the input shaft of the transmission mechanism, in order to suppress an excessive increase in the engine rotation speed, the upshift is to be performed under a low engine rotation speed in consideration of a rotation speed difference from the engine rotation speed. As a result, even when an acceleration request from a driver is large, it may not be possible to perform upshift under a high engine rotation speed.

The present invention is made in view of the above problem, and an object thereof is to perform upshift under a high engine rotation speed when an acceleration request from a driver is large.

According to one aspect of the present invention, an automatic transmission, comprising: a torque converter disposed downstream of a drive source in a power transmission path and provided with a lockup clutch; and a transmission mechanism disposed downstream of the torque converter and configured to change a speed ratio between an input shaft and an output shaft, wherein in a state where the lockup clutch is engaged, when a rotation speed of the input shaft reaches a first rotation speed, the automatic transmission starts upshift, in a state where the lockup clutch is disengaged or slips, when the rotation speed of the input shaft reaches a second rotation speed obtained by subtracting a first predetermined rotation speed from the first rotation speed, the automatic transmission starts upshift, and the first predetermined rotation speed decreases as an output torque of the drive source increases.

In the above aspect, when the output torque of the engine is large, the first predetermined rotation speed is small. Therefore, since the upshift is performed under a higher engine rotation speed, it is possible to perform shift after increasing the engine rotation speed in accordance with the acceleration request from the driver. Therefore, when the acceleration request from the driver is large, the upshift can be performed under a high engine rotation speed.

DESCRIPTION OF EMBODIMENTS

Hereinafter, an embodiment of the present invention will be described with reference to the accompanying drawings. Hereinafter, when a speed ratio is large, it is referred to as being low, and when a speed ratio is small, it is referred to as being high. Further, the speed ratio being changed to be lower is referred to as downshift, and the speed ratio being changed to be higher is referred to as upshift.

Figure 1:
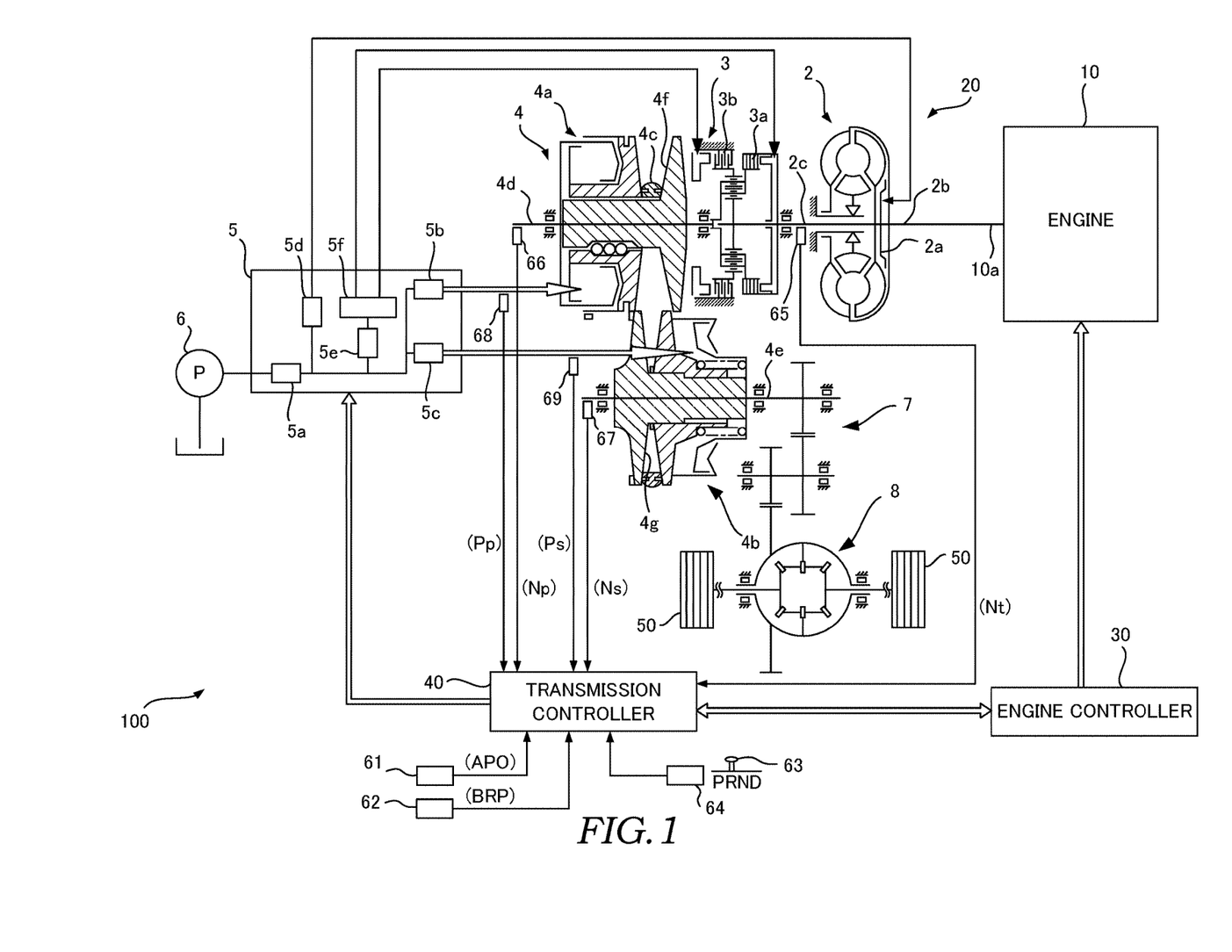
FIG. 1 is a schematic configuration diagram of a vehicle including an automatic transmission according to an embodiment of the present invention.

FIG. 1 is a schematic configuration diagram of a vehicle 100 including an automatic transmission 20 according to an embodiment of the present invention. As shown in FIG. 1, the vehicle 100 includes an engine 10 as a drive source, the automatic transmission 20, an engine controller 30, and a transmission controller 40.

The automatic transmission 20 includes a torque converter 2, a forward/reverse switching mechanism 3 as a power transmission mechanism, a variator 4 as a transmission mechanism, a hydraulic control circuit 5, and an oil pump 6.

In the vehicle 100, rotation generated in the engine 10 is transmitted to drive wheels 50 via a power transmission path constituted by the torque converter 2, the forward/reverse switching mechanism 3, the variator 4, a gear set 7, and a differential gear device 8.

The torque converter 2 is disposed downstream of the engine 10 in the power transmission path. The torque converter 2 is provided with a lockup clutch 2a. When the lockup clutch 2a is engaged, an input shaft 2b as an input element and an output shaft 2c as an output element of the torque converter 2 are directly connected to each other, and the input shaft 2b and the output shaft 2c rotate at the same speed. Therefore, when the lockup clutch 2a is engaged, rotation of the output shaft 10a of the engine 10 is directly transmitted from the output shaft 2c of the torque converter 2 to the forward/reverse switching mechanism 3.

The forward/reverse switching mechanism 3 includes a double pinion planetary gear set as a main component, a sun gear of which is coupled to the engine 10 via the torque converter 2, and a carrier of which is coupled to an input shaft 4d (primary pulley 4a) of the variator 4. The forward/ reverse switching mechanism 3 further includes a forward clutch 3a that directly connects the sun gear and the carrier of the double pinion planetary gear set, and a reverse brake 3b that fixes a ring gear. When the forward clutch 3a is engaged, input rotation from the engine 10 via the torque converter 2 is directly transmitted to the primary pulley 4a, and when the reverse brake 3b is engaged, the input rotation from the engine 10 via the torque converter 2 is reversely decelerated and transmitted to the primary pulley 4a.

The variator 4 is disposed downstream of the engine 10 and the torque converter 2 in the power transmission path. The variator 4 is a transmission mechanism (continuously variable transmission mechanism) that shifts the rotation of the engine 10 transmitted to the input shaft 4d and transmits the shifted rotation from an output shaft 4e to the drive wheels 50. That is, the variator 4 steplessly changes the speed ratio between the input shaft 4d and the output shaft 4e. The variator 4 includes a primary pulley 4a provided on the engine 10 side of the power transmission path, a secondary pulley 4b provided on the drive wheels 50 side of the power transmission path, and a belt 4c, which is an endless member wound around the primary pulley 4a and the secondary pulley 4b.

In the variator 4, a hydraulic pressure supplied to the primary pulley 4a and a hydraulic pressure supplied to the secondary pulley 4b are controlled, so that a contact radius between each of the pulleys 4a and 4b and the belt 4c is changed, and the speed ratio is changed. The belt 4c is in contact with sheave surfaces 4f and 4g of pulleys 4a and 4b to transmit power between the primary pulley 4a and the secondary pulley 4b.

The oil pump 6 is a mechanical oil pump that receives the rotation of the engine 10 and is driven using part of the power of the engine 10. Oil discharged from the oil pump 6 is supplied to the hydraulic control circuit 5.

The hydraulic control circuit 5 includes a regulator valve 5a that regulates pressure of hydraulic oil supplied from the oil pump 6 to generate a required hydraulic pressure, a primary solenoid valve 5b that adjusts a hydraulic pressure supplied to the primary pulley 4a, a secondary solenoid valve 5c that adjusts a hydraulic pressure supplied to the secondary pulley 4b, a lock-up solenoid valve 5d that adjusts a hydraulic pressure supplied to the lockup clutch 2a, a select solenoid valve 5e that adjusts a hydraulic pressure supplied to the forward clutch 3a and a hydraulic pressure supplied to the reverse brake 3b, a manual valve 5f that switches supply paths of the hydraulic pressures to the forward clutch 3a and the reverse brake 3b, and the like.

The hydraulic control circuit 5 supplies the adjusted hydraulic pressure to each part of the torque converter 2, the forward/reverse switching mechanism 3, and the variator 4 based on a control signal from the transmission controller 40.

The engine controller 30 is implemented by a microcomputer including a CPU, a RAM, a ROM, an input and output interface, and the like. The engine controller 30 performs various processing by reading and executing programs stored in the ROM by the CPU. The engine controller 30 may also be implemented by a plurality of microcomputers.

The engine controller 30 controls a rotation speed, a torque, and the like of the engine 10 based on signals from various sensors that each detects a state of a part of the vehicle 100.

The transmission controller 40 is implemented by a microcomputer including a CPU, a RAM, a ROM, an input and output interface, and the like, and is communicably connected to the engine controller 30. The transmission controller 40 performs various processing by reading and executing programs stored in the ROM by the CPU. The transmission controller 40 may also be implemented by a plurality of microcomputers. The transmission controller 40 and the engine controller 30 may be integrated into one controller.

The transmission controller 40 controls an engaged state of the lockup clutch 2a, the speed ratio of the variator 4, engaged states of the forward clutch 3a and the reverse brake 3b, and the like based on the signals from various sensors that each detects a state of a part of the vehicle 100.

The transmission controller 40 receives a signal from an accelerator pedal opening sensor 61 that detects an accelerator pedal opening APO, a signal from a brake fluid pressure sensor 62 that detects a brake fluid pressure BRP corresponding to an amount of operation on a brake pedal, a signal from an inhibitor switch 64 that detects a position of a shifter 63, a signal from a turbine rotation speed sensor 65 that detects a rotation speed Nt of the output shaft 2c of the torque converter 2, a signal from a primary rotation speed sensor 66 that detects a rotation speed Np of the input shaft 4d (primary pulley 4a) of the variator 4, a signal from a secondary rotation speed sensor 67 that detects a rotation speed Ns of the output shaft 4e (secondary pulley 4b) of the variator 4, a signal from a primary hydraulic pressure sensor 68 that detects a primary hydraulic pressure Pp supplied to the primary pulley 4a, a signal from a secondary hydraulic pressure sensor 69 that detects a secondary hydraulic pressure Ps supplied to the secondary pulley 4b, and the like.

Next, shift control processing during acceleration performed by the transmission controller 40 will be described with reference to FIGS. 2 to 4. The shift control processing is executed by the transmission controller 40 at a regular time interval.

First, the shift control processing during acceleration performed by the transmission controller 40 will be described with reference to FIGS. 2 and 3. FIG. 2 is a flowchart showing the shift control processing during acceleration performed by the transmission controller 40. FIG. 3 is a diagram conceptually explaining an upshift determination rotation speed.

The shift control during acceleration is executed when an acceleration request from a driver is large, such as when the driver depresses an accelerator pedal to fully accelerate the vehicle 100. Here, the automatic transmission 20 is a continuously variable transmission that stepwisely performs stepped shift control as a stepped transmission.

In the torque converter 2, when the lockup clutch 2a is engaged, the rotation speed of the input shaft 2b (rotation speed of the engine 10) and the rotation speed of the output shaft 2c (rotation speed of the input shaft 4d of the variator 4) are the same. On the other hand, in the torque converter 2, when the lockup clutch 2a is not engaged, the rotation speed of the input shaft 2b is higher than the rotation speed of the output shaft 2c. In the automatic transmission 20, upshift determination is made based on the rotation speed of the input shaft 4d, but when the lockup clutch 2a is not engaged, in order to suppress an excessive increase in the rotation speed of the engine 10, the upshift determination is made with a margin corresponding to a rotation speed difference between the input shaft 2b and the output shaft 2c.

However, for example, in a state immediately before the lockup clutch 2a is completely engaged (slipping state), the rotation speed difference between the input shaft 2b and the output shaft 2c is smaller than when the lockup clutch 2a is disengaged. That is, the rotation speed difference between the input shaft 2b and the output shaft 2c changes according to an engagement degree of the lockup clutch 2a. Therefore, in the state immediately before the lockup clutch 2a is completely engaged, if upshift is performed with a margin corresponding to the rotation speed difference between the input shaft 2b and the output shaft 2c as in the case where the lockup clutch 2a is disengaged, the upshift may be performed under a low rotation speed of the engine 10. Therefore, in the automatic transmission 20, the shift control during acceleration is performed in consideration of the engagement degree of the lockup clutch 2a as follows.

Figure 2:
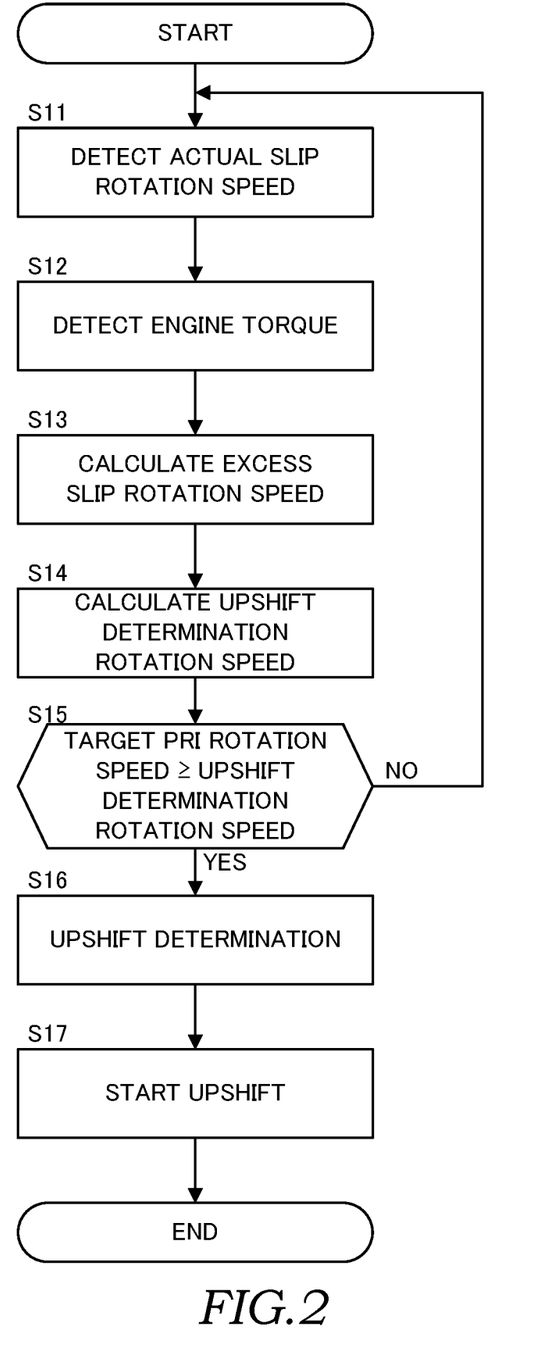
FIG. 2 is a flowchart showing shift control processing during acceleration performed by a transmission controller.

In step S11 of FIG. 2, the transmission controller 40 detects the current actual slip rotation speed of the torque converter 2. Specifically, the transmission controller 40 detects the rotation speed of the input shaft 2b based on the signal from the engine controller 30, detects the rotation speed of the output shaft 2c based on the signal from the turbine rotation speed sensor 65, and uses the rotation speed difference between the input shaft 2b and the output shaft 2c as the actual slip rotation speed.

In step S12, the transmission controller 40 detects the output torque of the engine 10 based on the signal from the engine controller 30.

In step S13, the excess slip rotation speed of the torque converter 2 that may occur from the current time is calculated. The excess slip rotation speed is calculated based on a difference between the current output torque and the maximum torque of the engine 10 (remaining power of the output torque) and fluid characteristics of the torque converter 2.

Specifically, the greater the difference between the current output torque and the maximum torque of the engine 10, the greater the slip rotation speed of the torque converter 2 may be, which occurs when the accelerator pedal is further depressed. That is, the greater the current output torque of the engine 10, the smaller the difference from the maximum torque, so that the slip rotation speed of the torque converter 2 that may occur when the accelerator pedal is further depressed is small. Therefore, the excess slip rotation speed is set to decrease as the current output torque of the engine 10 increases.

In step S14, the transmission controller 40 calculates the upshift determination rotation speed by subtracting the actual slip rotation speed detected in step S11 and the excess slip rotation speed calculated in step S13 from an upper limit rotation speed (LU upper limit PRI rotation speed) of the primary pulley 4a when the lockup clutch 2a is engaged.

Figure 3:
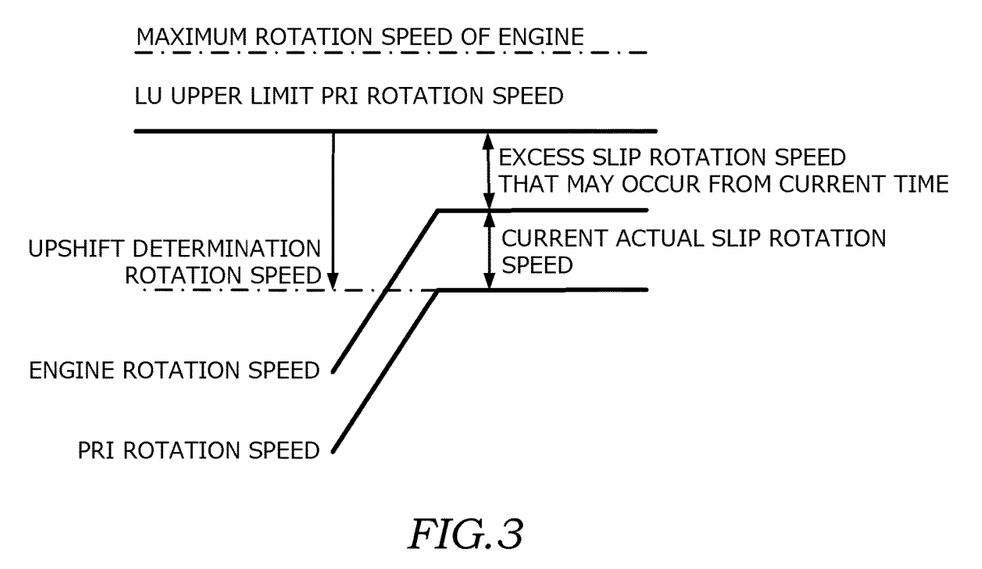
FIG. 3 is a diagram conceptually explaining an upshift determination rotation speed.

Specifically, as shown in FIG. 3, the rotation speed of the engine 10 is higher than the rotation speed (PRI rotation speed) of the primary pulley 4a by the current actual slip rotation speed. Therefore, a value obtained by subtracting the current actual slip rotation speed and the excess slip rotation speed of the torque converter 2 that may occur from the current time from the LU upper limit PRI rotation speed is used as the upshift determination rotation speed. Note that the LU upper limit PRI rotation speed is set lower than the maximum rotation speed of the engine 10 in order to suppress an excessive increase in the rotation speed of the engine 10.

When the lockup clutch 2a is engaged, both the actual slip rotation speed and the excess slip rotation speed are zero. Therefore, the upshift determination rotation speed is the same as the LU upper limit PRI rotation speed.

Returning to FIG. 2, in step S15, the transmission controller 40 determines whether a target primary pulley rotation speed (target PRI rotation speed) is equal to or higher than the upshift determination rotation speed. If it is determined in step S15 that the target PRI rotation speed is equal to or higher than the upshift determination rotation speed, the processing proceeds to step S16. On the other hand, if it is determined in step S15 that the target PRI rotation speed is not equal to or higher than the upshift determination rotation speed, that is, the target PRI rotation speed is lower than the upshift determination rotation speed, the processing from step S11 to step S15 is repeated.

In step S16, the transmission controller 40 determines to execute upshift. Then, in step S17, the transmission controller 40 executes upshift of the automatic transmission 20. Specifically, the transmission controller 40 performs upshift until the PRI rotation speed reaches a rotation speed corresponding to a gear position one level higher.

Figure 4:
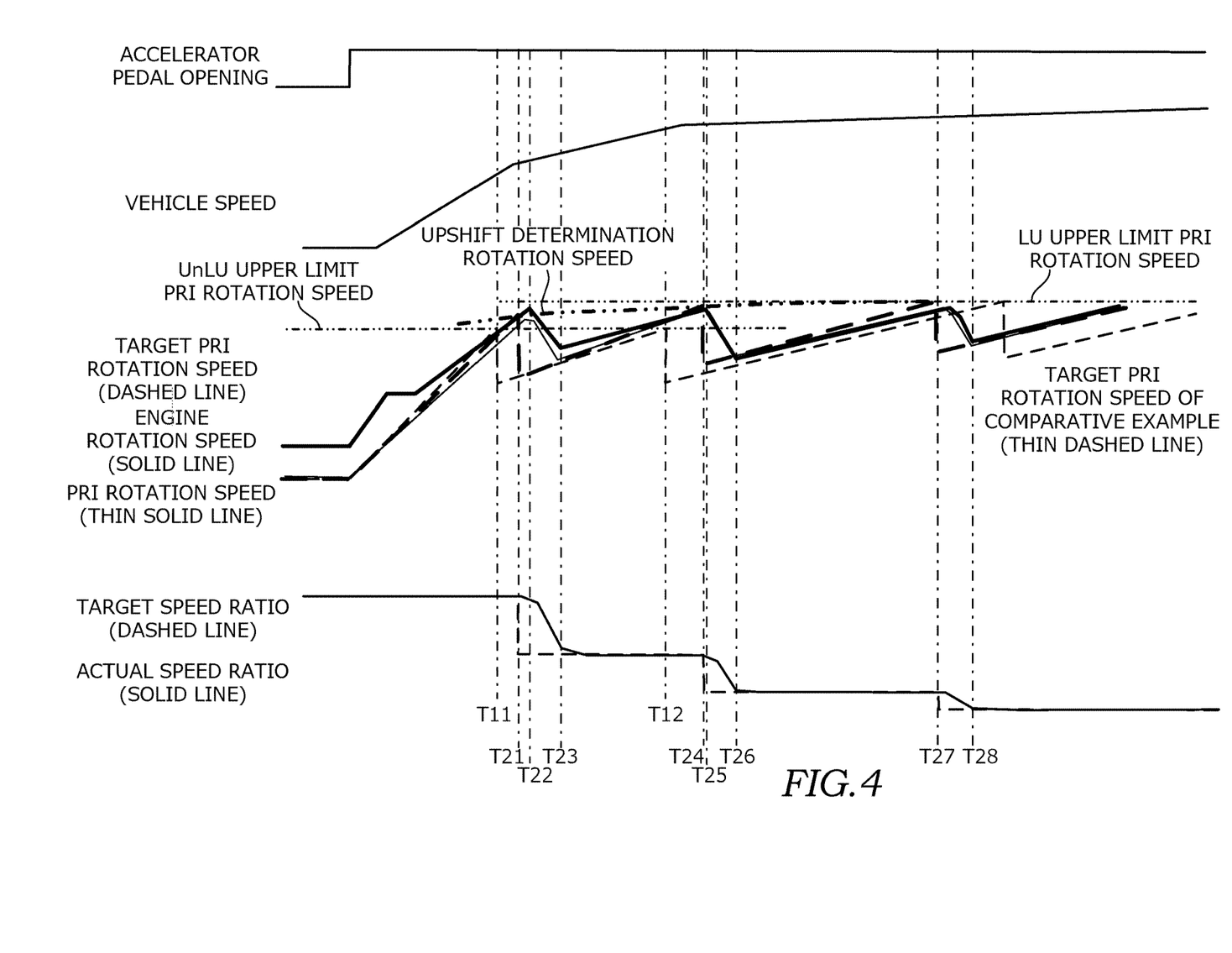
FIG. 4 is a timing chart explaining the shift control during acceleration.

Next, with reference to FIG. 4, the shift control during acceleration performed by the transmission controller 40 will be specifically described. FIG. 4 is a timing chart explaining the shift control during acceleration.

In FIG. 4, a horizontal axis indicates time [sec], and vertical axes indicate an accelerator pedal opening (opening degree) APO, a vehicle speed [km/h], the target primary pulley rotation speed (target PRI rotation speed: dashed line) [rpm], the engine rotation speed (solid line) [rpm], the primary pulley rotation speed (PRI rotation speed: thin solid line) [rpm], a target primary pulley rotation speed of a comparative example (target PRI rotation speed: thin dashed line) [rpm], a target speed ratio (dashed line), and an actual speed ratio (solid line).

The target PRI rotation speed of the comparative example indicates a case where the upshift determination is made using two thresholds for when the lockup clutch 2a is engaged and when it is not engaged, without applying the present embodiment. Specifically, when the lockup clutch 2a is engaged, the lockup upper limit primary pulley rotation speed (LU upper limit PRI rotation speed) is used as the threshold, and when the lockup clutch 2a is not engaged, an un-lockup upper limit primary pulley rotation speed (UnLU upper limit PRI rotation speed) is used as the threshold.

At a timing T11, in an automatic transmission according to the comparative example, the target PRI rotation speed reaches the UnLU upper limit PRI rotation speed, and therefore the transmission controller 40 makes an upshift determination. Similarly, at a timing T12, in the automatic transmission according to the comparative example, the target PRI rotation speed reaches the UnLU upper limit PRI rotation speed, and therefore the transmission controller 40 makes an upshift determination.

In this way, in the automatic transmission according to the comparative example, the upshift determination is made and the upshift is executed until the rotation speed of the engine 10 becomes sufficiently high. Therefore, the engine 10 cannot be used up to a high rotation speed.

On the other hand, in the automatic transmission 20 according to the present embodiment, the upshift determination rotation speed, which is obtained by subtracting the current actual slip rotation speed and the excess slip rotation speed of the torque converter 2 that may occur from the current time from the LU upper limit PRI rotation speed of the primary pulley 4a with the lockup clutch 2a engaged, is used as the threshold.

At a timing T21, the transmission controller 40 makes an upshift determination since the target PRI rotation speed reaches the upshift determination rotation speed. That is, in the state where the lockup clutch 2a is disengaged or slips, when the rotation speed of the input shaft 2b reaches the upshift determination rotation speed, which is obtained by subtracting the current actual slip rotation speed and the excess slip rotation speed of the torque converter 2 that may occur from the current time from the LU upper limit PRI rotation speed, the upshift is started. As a result, the upshift determination is made in a state where the rotation speed of the engine 10 increases from the timing T11, so that the upshift is executed after the rotation speed of the engine 10 sufficiently increases at a timing T22. Therefore, the engine 10 can be used up to a higher rotation speed.

At a timing T23, the rotation speed of the engine 10 decreases so that the speed ratio is shifted to a gear position one level higher in the stepped shift control, and then the rotation speed of the engine 10 increases again.

Similarly, at a timing T24, in the automatic transmission 20 according to the present embodiment, the transmission controller 40 makes an upshift determination since the target PRI rotation speed reaches the upshift determination rotation speed. In this case, the lockup clutch 2a is in a state immediately before being completely engaged. Therefore, the actual slip rotation speed and the excess slip rotation speed of the torque converter 2 that may occur from the current time are smaller than at the timing T21. Therefore, the upshift determination rotation speed is set higher than at the timing T21. In this way, the upshift determination is made in a state where the rotation speed of the engine 10 increases from the timing T12, so that the upshift is executed after the rotation speed of the engine 10 sufficiently increases at a timing T25. Therefore, the engine 10 can be used up to a higher rotation speed.

At a timing T26, the rotation speed of the engine 10 decreases so that the speed ratio is shifted to a gear position one level higher in the stepped shift control, and then the rotation speed of the engine 10 increases again.

At a timing T27, in the automatic transmission 20 according to the present embodiment, the transmission controller 40 makes an upshift determination since the target PRI rotation speed reaches the upshift determination rotation speed. In this case, the lockup clutch 2a is in a state of being completely engaged. Therefore, the upshift determination rotation speed matches the LU upper limit PRI rotation speed.

As described above, in the automatic transmission 20, in the state where the lockup clutch 2a is engaged, when the rotation speed of the input shaft 2b reaches a first rotation speed, the upshift is started, and in the state where the lockup clutch 2a is disengaged or slips, when the rotation speed of the input shaft 2b reaches a second rotation speed obtained by subtracting a first predetermined rotation speed from the first rotation speed, the upshift is started. In this case, the higher the output torque of the engine 10, the lower the first predetermined rotation speed is set. Specifically, the first predetermined rotation speed is the sum of the actual slip rotation speed of the lockup clutch 2a and the excess slip rotation speed of the lockup clutch 2a that is possible to occur before upshift is started.

When the output torque of the engine 10 is large, the sum (first predetermined rotation speed) of the current actual slip rotation speed and the excess slip rotation speed of the torque converter 2 that may occur from the current time is set to be small. Therefore, since the upshift is performed under a higher rotation speed of the engine 10, it is possible to perform shift after increasing the rotation speed of the engine 10 in accordance with the acceleration request from the driver. Therefore, when the acceleration request from the driver is large, the upshift can be performed under a high rotation speed of the engine 10. Therefore, it is possible to perform shift in accordance with an intention of the driver. In this case, since the difference from the maximum torque of the engine 10 is small, even when the output torque of the engine 10 increases before the upshift, an excessive increase in the rotation speed of the engine 10 can be suppressed.

On the other hand, when the output torque of the engine 10 is small, it may deviate from the maximum torque of the engine 10 compared with the case where the output torque is large. In such a state, the output torque of the engine 10 increases before the upshift, and may exceed the rotation speed of the engine 10 at which the upshift is to be performed.

On the other hand, in the automatic transmission 20, when the output torque of the engine 10 is small, the upshift is performed at a low rotation speed of the engine 10 corresponding to the small output torque, and therefore, an excessive increase in the rotation speed of the engine 10 due to a delay in the upshift timing can be suppressed.

Even when the lockup clutch 2a is in a slipping state, when the rotation speed reaches the second rotation speed, which is obtained by subtracting the actual slip rotation speed and the excess slip rotation speed that may occur before the upshift is started from the first rotation speed, the upshift is started. Therefore, it is possible to perform upshift under a high rotation speed when the engine 10 is running near the maximum torque while suppressing an excessive increase in the rotation speed of the engine 10. Therefore, it is possible to perform shift in accordance with the intention of the driver.

The variator 4 is a continuously variable transmission mechanism that changes the speed ratio between the input shaft 2b and the output shaft 4e in a stepless manner. In the state where the lockup clutch 2a is engaged, when the rotation speed of the input shaft 2b reaches the first rotation speed, the variator executes upshift until the input shaft reaches a third rotation speed, and in the state where the lockup clutch 2a is disengaged or slips, when the rotation speed of the input shaft 2a reaches the second rotation speed, the variator executes upshift until the input shaft reaches the third rotation speed.

As a result, even when the shift control during acceleration according to the present embodiment is applied to a continuously variable transmission that stepwise performs stepped shift control as a stepped transmission, when the acceleration request from the driver is large, the upshift can be performed under a high rotation speed of the engine 10. Therefore, it is possible to perform shift in accordance with the intention of the driver.

Next, delay control based on a predicted vehicle speed in the shift control during acceleration performed by the transmission controller 40 will be described with reference to FIGS. 5 to 8. The delay control based on the predicted vehicle speed is executed by the transmission controller 40 at a regular time interval.

Figure 5:
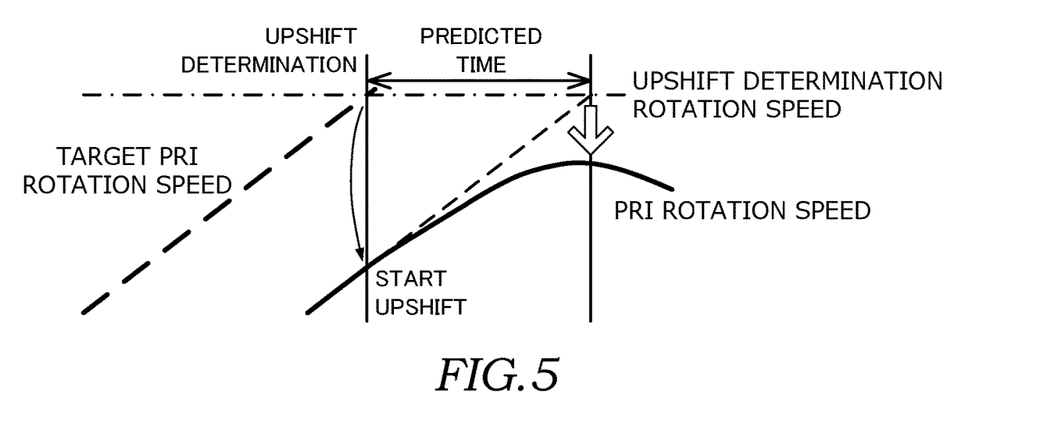
FIG. 5 is a diagram conceptually explaining a predicted vehicle speed.
Figure 6:
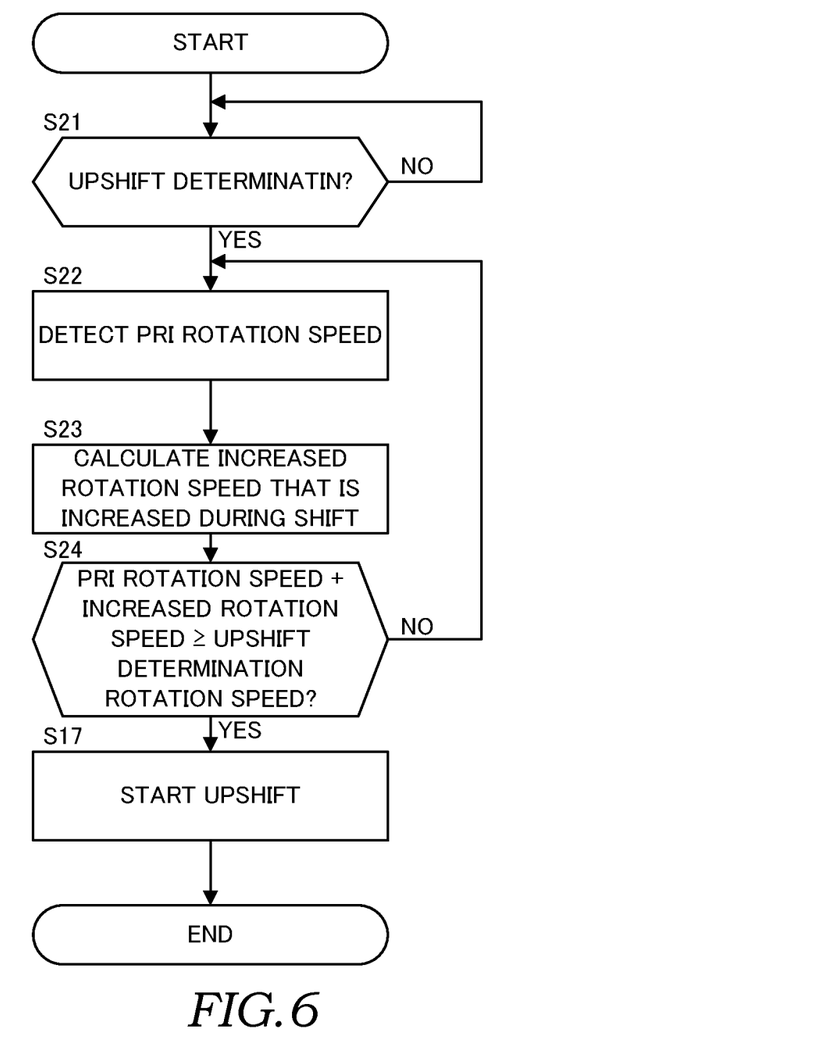
FIG. 6 is a flowchart showing delay control based on the predicted vehicle speed performed by the transmission controller.
Figure 7:
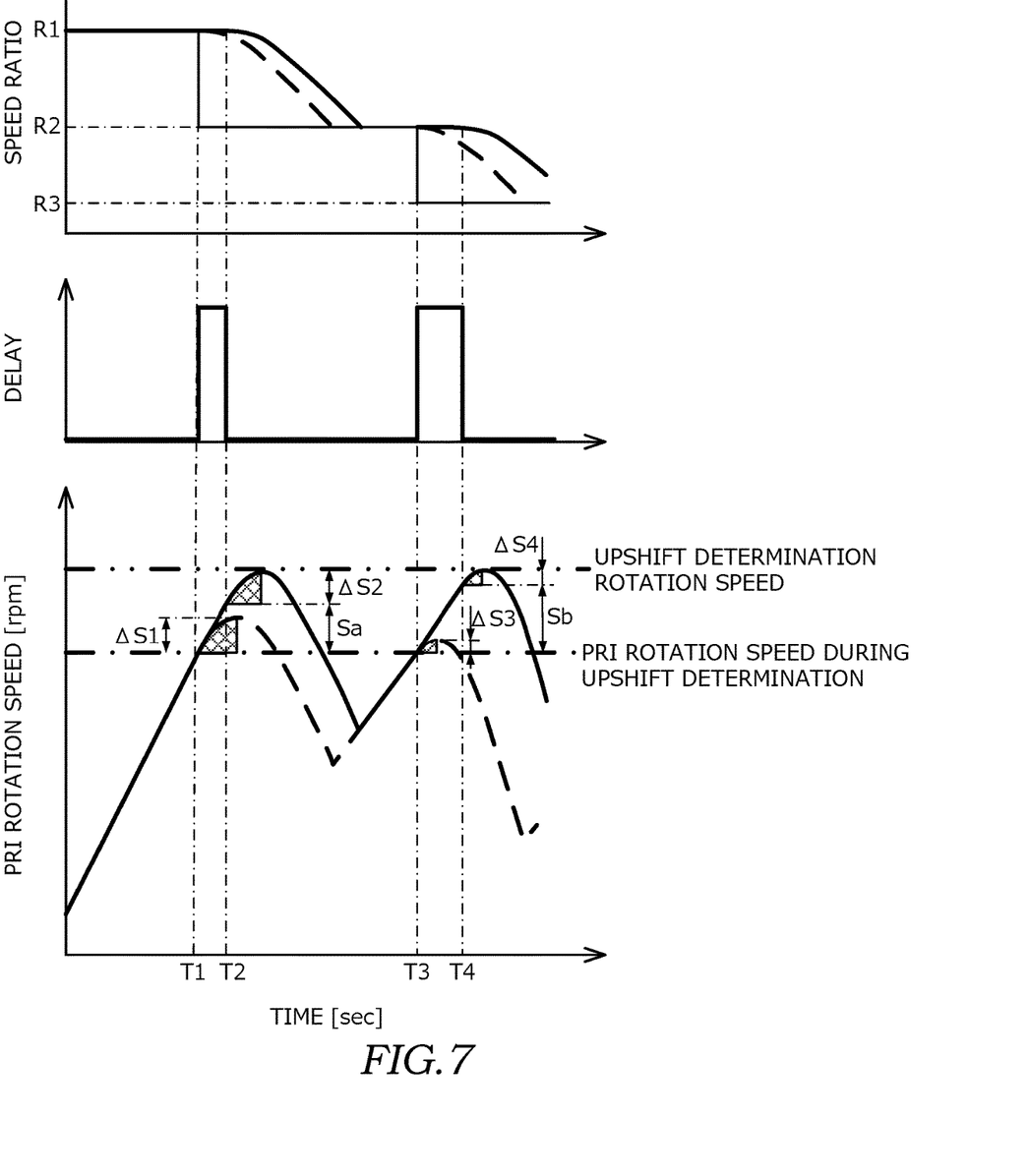
FIG. 7 is a diagram conceptually explaining the delay control based on the predicted vehicle speed.

First, the delay control based on the predicted vehicle speed performed by the transmission controller 40 will be described with reference to FIGS. 5 to 7. FIG. 5 is a diagram conceptually explaining the predicted vehicle speed. FIG. 6 is a flowchart showing the delay control based on the predicted vehicle speed performed by the transmission controller 40. FIG. 7 is a diagram conceptually explaining the delay control based on the predicted vehicle speed.

As shown in FIG. 5, in the automatic transmission 20, when an upshift determination is made and upshift is actually started, the PRI rotation speed gently increases and then decreases toward the target PRI rotation speed after the upshift. Therefore, in the automatic transmission 20, in order to prevent the rotation speed of the engine 10 from overshooting and increasing excessively, the target PRI rotation speed is set from the PRI rotation speed after a predicted time (first predetermined time), that is, the vehicle speed after the predicted time (the predicted vehicle speed). This predicted time is set to 0.25 [sec], for example.

In this case, if the upshift is started when the target PRI rotation speed reaches the upshift determination rotation speed, the upshift is started while the PRI rotation speed is low, and therefore the PRI rotation speed after the predicted time may not reach the upshift determination rotation speed. That is, even when the acceleration request from the driver is large, it may not be possible to perform the upshift under a high rotation speed of the engine 10. Therefore, in the automatic transmission 20, the shift control during acceleration is performed in consideration of the predicted vehicle speed as follows.

In step S21 of FIG. 6, the transmission controller 40 determines whether there is an upshift determination. If it is determined in step S21 that there is an upshift determination, the processing proceeds to step S22. The processing of step S21 determines "Yes" when there is an upshift determination in step S16 of FIG. 2. On the other hand, if it is determined in step S21 that there is no upshift determination, the processing of step S21 is repeated.

In step S22, the transmission controller 40 detects the PRI rotation speed based on the signal from the primary rotation speed sensor 66.

In step S23, the transmission controller 40 calculates an increased rotation speed of the primary pulley 4*a* that is increased during the upshift after the start of the upshift.

In step S24, the transmission controller 40 determines whether the sum of the PRI rotation speed and the increased rotation speed is equal to or higher than the upshift determination rotation speed (first target rotation speed) during upshift determination. If it is determined in step S24 that the sum of the PRI rotation speed and the increased rotation speed is not equal to or higher than the upshift determination rotation speed during upshift determination, that is, is lower than the upshift determination rotation speed during upshift determination, the processing from step S22 to step S24 is repeated. On the other hand, if it is determined in step S24 that the sum of the PRI rotation speed and the increased rotation speed is equal to or higher than the upshift determination rotation speed during upshift determination, the processing proceeds to step S17. That is, the transmission controller 40 performs the delay control by repeating the processing of step S24 until the sum of the PRI rotation speed and the increased rotation speed reaches the upshift determination rotation speed during upshift determination.

Here, the delay control will be specifically described with reference to FIG. 7.

At a timing T1, an upshift determination is made, and the target speed ratio of the automatic transmission 20 is changed from R1 to R2. Here, the transmission controller 40 calculates the increased rotation speed ΔS1 that is increased during the upshift when the upshift is executed at the timing T1.

At the timing T2, the transmission controller 40 determines that the sum of the PRI rotation speed and the increased rotation speed ΔS2 reaches the upshift determination rotation speed. The transmission controller 40 starts the upshift of the automatic transmission 20 at the timing T2 delayed from the timing T1 at which the upshift determination is made. In this case, an increased rotation speed for delay Sa that is increased from the timing T1 when it is determined that the upshift is to be performed to the timing T2 when the upshift is started corresponds to the predetermined rotation speed. An increased rotation speed for delay ΔSa is set based on the PRI rotation speed that increases from when the target PRI rotation speed reaches the upshift determination rotation speed until the upshift is actually performed. As a result, the PRI rotation speed can be used up to the upshift determination rotation speed. Therefore, when the acceleration request from the driver is large, the upshift can be performed under a higher rotation speed of the engine 10.

Similarly, at a timing T3, there is an upshift determination, and the target speed ratio of the automatic transmission 20 is changed from R2 to R3. Here, the transmission controller 40 calculates an increased rotation speed ΔS3 that is increased during the upshift when the upshift is performed at the timing T3.

At a timing T4, the transmission controller 40 determines that the sum of the PRI rotation speed and an increased rotation speed ΔS4 reaches the upshift determination rotation speed. The transmission controller 40 starts the upshift of the automatic transmission 20 at the timing T4 delayed from the timing T3 when the upshift determination is made. In this case, an increased rotation speed for delay Sb that is increased from the timing T3 when it is determined that the upshift is to be performed to the timing T4 when the upshift is started corresponds to the predetermined rotation speed. An increased rotation speed for delay ΔSb is also set based on the PRI rotation speed that increases from when the target PRI rotation speed reaches the upshift determination rotation speed until the upshift is actually performed. As a result, the PRI rotation speed can be used up to the upshift determination rotation speed. Therefore, when the acceleration request from the driver is large, the upshift can be performed under a higher rotation speed of the engine 10.

Returning to FIG. 6, in step S17, the transmission controller 40 executes upshift of the automatic transmission 20. Specifically, when the PRI rotation speed reaches the second rotation speed, the transmission controller 40 performs upshift until the PRI rotation speed reaches a rotation speed (second target rotation speed) corresponding to a gear position one level higher.

Figure 8:
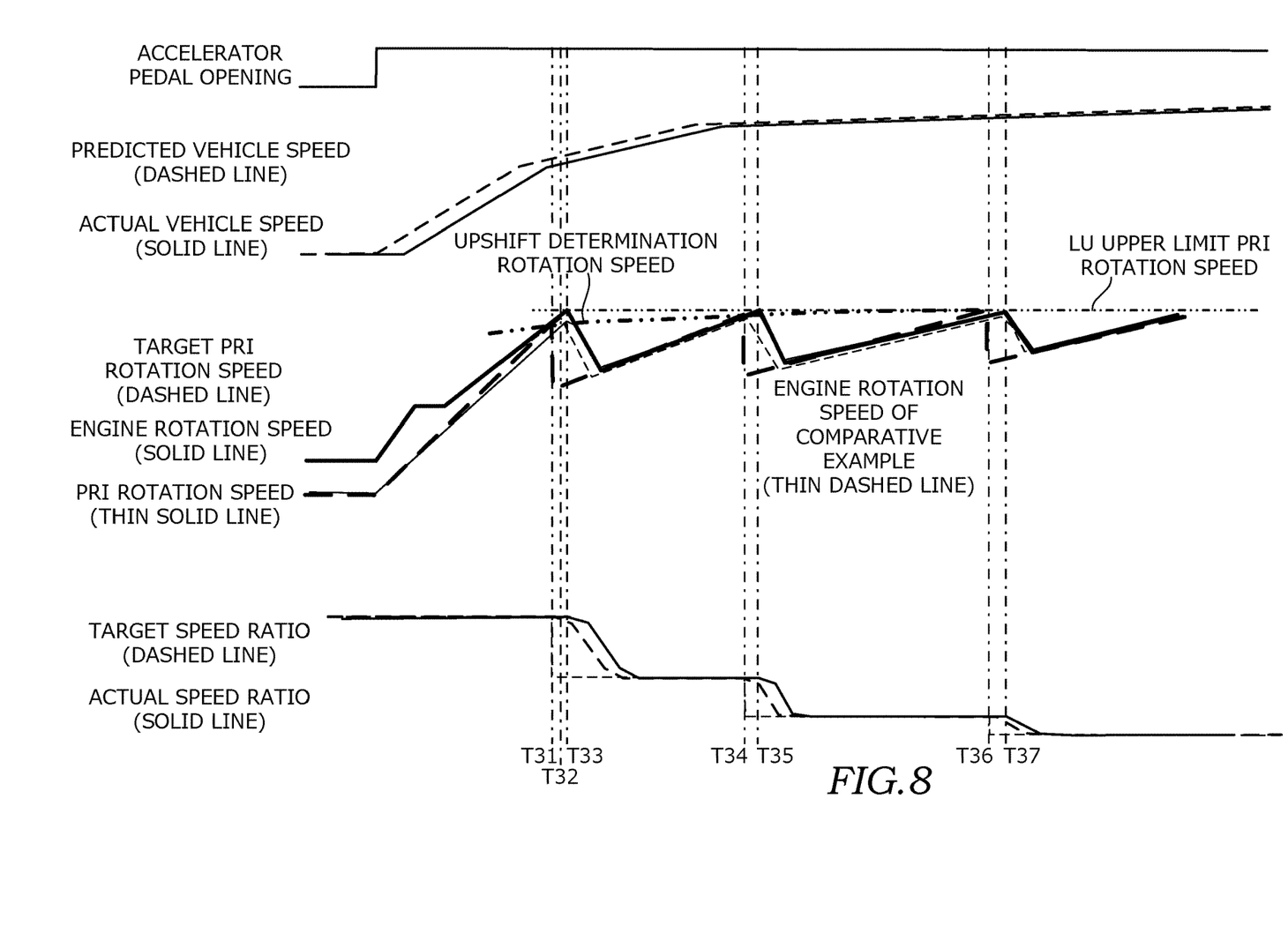
FIG. 8 is a timing chart explaining a case where the delay control based on the predicted vehicle speed is further applied to the shift control during acceleration in FIG. 4.

Next, with reference to FIG. 8, the shift control during acceleration performed by the transmission controller 40 will be specifically described. FIG. 8 is a timing chart explaining a case where the delay control based on the predicted vehicle speed is further applied to the shift control during acceleration in FIG. 4.

In FIG. 8, a horizontal axis indicates time [sec], and vertical axes indicate the accelerator pedal opening APO, the predicted vehicle speed (dashed line) [km/h], an actual vehicle speed (solid line) [km/h], the target primary pulley rotation speed (target PRI rotation speed: dashed line) [rpm], the engine rotation speed (solid line) [rpm], the primary rotation speed (PRI rotation speed: thin solid line) [rpm], the engine rotation speed of the comparative example (thin dashed line) [rpm], the target speed ratio (dashed line), and the actual speed ratio (solid line).

The PRI rotation speed of the comparative example is a rotation speed of the engine 10 shown in FIG. 4 to which the delay control based on the predicted vehicle speed is not applied.

At a timing T31, the transmission controller 40 makes an upshift determination since the target PRI rotation speed reaches the upshift determination rotation speed. Since the upshift determination is the same as at the timing T21 in FIG. 4, detailed description thereof is omitted here.

In the continuously variable transmission according to the comparative example, the upshift is started at the timing T31, and the rotation speed of engine 10 reaches the maximum value during shift at a timing T32. Then, the PRI rotation speed and the rotation speed of the engine 10 decrease until the rotation speed is shifted to a gear position one level higher.

On the other hand, when the delay control based on the predicted vehicle speed is applied, the execution of the upshift is delayed, and the rotation speed of the engine 10 reaches the maximum value during shift at the timing T33, which is later than the timing T32. In this case, the PRI rotation speed reaches the upshift determination rotation speed at which the upshift determination is made, and the rotation speed of the engine 10 reaches the LU upper limit PRI rotation speed.

Similarly, at a timing T34, in the automatic transmission 20 according to the present embodiment, the transmission controller 40 makes an upshift determination since the target PRI rotation speed reaches the upshift determination rotation speed. Then, the execution of the upshift is delayed, and at a timing T35, the rotation speed of the engine 10 reaches the maximum value during shift. In this case, the PRI rotation speed also reaches the upshift determination rotation speed at which the upshift determination is made, and the rotation speed of the engine 10 also reaches the LU upper limit PRI rotation speed.

At a timing T36, the transmission controller 40 makes an upshift determination since the target PRI rotation speed reaches the upshift determination rotation speed. Then, the execution of the upshift is delayed, and at a timing T37, the rotation speed of the engine 10 reaches the maximum value during shift. In this case, the PRI rotation speed also reaches the upshift determination rotation speed at which the upshift determination is made, and the rotation speed of the engine 10 also reaches the LU upper limit PRI rotation speed.

As described above, when the target PRI rotation speed, which is set based on the vehicle speed reached when the predicted time (first predetermined time) elapses, reaches the upshift determination rotation speed (first target rotation speed), the automatic transmission 20 is determined to perform upshift until the PRI rotation speed reaches a rotation speed (second target rotation speed) corresponding to a gear position one level higher, and starts the upshift after the target PRI rotation speed reaches the upshift determination rotation speed (first target rotation speed) and the PRI rotation speed increases by the increased rotation speed for delay (predetermined rotation speed).

As a result, after the target PRI rotation speed reaches the upshift determination rotation speed and it is determined to perform the upshift to the second target rotation speed, the upshift is started after the PRI rotation speed is further increased. Therefore, when the acceleration request from the driver is large, the upshift can be performed under a high rotation speed of the engine 10. Therefore, it is possible to perform shift in accordance with the intention of the driver.

The increased rotation speed for delay is set based on the PRI rotation speed of the primary pulley 4*a* (input shaft 4*d*) that increases from when the target PRI rotation speed reaches the upshift determination rotation speed until the upshift is actually performed.

As a result, even when the rotation speed of the engine 10 when starting the upshift is set high, it is possible to prevent the rotation speed of the engine 10 from becoming too high.

As described above, when the target PRI rotation speed, which is set based on the vehicle speed reached when the first predetermined time elapses, reaches the first target rotation speed, it is determined to perform upshift to reach the second target rotation speed, and starts the upshift after the PRI rotation speed reaches the upshift determination rotation speed and increases by the increased rotation speed for delay.

Alternatively, the upshift may be started after the PRI rotation speed reaches the upshift determination rotation speed and a second predetermined time elapses. The second predetermined time is set based on the PRI rotation speed of the primary pulley 4*a* (input shaft 4*d*) that increases from when the target PRI rotation speed reaches the upshift determination rotation speed until the upshift is actually performed.

Similarly in this case, after the target PRI rotation speed reaches the upshift determination rotation speed and it is determined to perform the upshift to the second target rotation speed, the upshift is started after the PRI rotation speed is further increased. Therefore, when the acceleration request from the driver is large, the upshift can be performed under a high rotation speed of the engine 10. Therefore, it is possible to perform shift in accordance with the intention of the driver.

The configurations and effects of the present embodiment described above will be collectively described.

(1) (4) The automatic transmission 20 includes: a torque converter 2 that is disposed downstream of the engine 10 in the power transmission path and is provided with the lockup clutch 2*a*; and a variator 4 that is disposed downstream of the torque converter 2, and changes the speed ratio between the input shaft 2*b* and the output shaft 4*e*. In the state where the lockup clutch 2*a* is engaged, when the rotation speed of the input shaft 2*b* reaches the first rotation speed, the automatic transmission 20 starts upshift. In the state where the lockup clutch 2*a* is disengaged or slips, when the rotation speed of the input shaft 2*b* reaches the second rotation speed obtained by subtracting the first predetermined rotation speed from the first rotation speed, the automatic transmission 20 starts upshift. The first predetermined rotation speed decreases as the output torque of the engine 10 increases.

With this configuration, when the output torque of the engine 10 is large, the first predetermined rotation speed is small. Therefore, since the upshift is performed under a higher rotation speed of the engine 10, it is possible to perform shift after increasing the rotation speed of the engine 10 in accordance with the acceleration request from the driver. Therefore, when the acceleration request from the driver is large, the upshift can be performed under a high rotation speed of the engine 10. Therefore, it is possible to perform shift in accordance with an intention of the driver. In this case, since the difference from the maximum torque of the engine 10 is small, even when the output torque of the engine 10 increases before the upshift, an excessive increase in the rotation speed of the engine 10 can be suppressed.

On the other hand, when the output torque of the engine 10 is small, it may deviate from the maximum torque of the engine 10 compared with the case where the output torque is large. In such a state, the output torque of the engine 10 increases before the upshift, and may exceed the rotation speed of the engine 10 at which the upshift is to be performed. On the other hand, in the automatic transmission 20, when the output torque of the engine 10 is small, the upshift is performed at a low rotation speed of the engine 10 corresponding to the small output torque, and therefore, an excessive increase in the rotation speed of the engine 10 due to a delay in the upshift timing can be suppressed.

(2) The first predetermined rotation speed is the sum of the actual slip rotation speed of the lockup clutch 2*a* and the excess slip rotation speed of the lockup clutch 2*a* that is possible to occur before upshift is started.

With this configuration, even when the lockup clutch 2a is in a slipping state, when the rotation speed reaches the second rotation speed, which is obtained by subtracting the actual slip rotation speed and the excess slip rotation speed that may occur before the upshift is started from the first rotation speed, the upshift is started. Therefore, it is possible to perform upshift under a high rotation speed when the engine 10 is running near the maximum torque while suppressing an excessive increase in the rotation speed of the engine 10. Therefore, it is possible to perform shift in accordance with the intention of the driver.

(3) The variator 4 is a continuously variable transmission mechanism that changes the speed ratio between the input shaft 2b and the output shaft 4e in a stepless manner. In the state where the lockup clutch 2a is engaged, when the rotation speed of the input shaft 2b reaches the first rotation speed, the variator executes upshift until the input shaft reaches the third rotation speed, and in the state where the lockup clutch 2a is disengaged or slips, when the rotation speed of the input shaft 2a reaches the second rotation speed, the variator executes upshift until the input shaft reaches the third rotation speed.

With this configuration, even when the present embodiment is applied to a continuously variable transmission that stepwisely performs stepped shift control as a stepped transmission, when the acceleration request from the driver is large, the upshift can be performed under a high rotation speed of the engine 10. Therefore, it is possible to perform shift in accordance with the intention of the driver.

While an embodiment of the invention has been described, the embodiment is merely one of application examples of the invention, and does not intend to limit a technical scope of the invention to a specific configuration according to the embodiment.

For example, in the above embodiment, the case is described where the automatic transmission 20 is a continuously variable transmission that stepwisely performs stepped shift control as a stepped transmission. However, the automatic transmission 20 may be a continuously variable transmission in which stepped shift control is not performed, or may be an automatic transmission including a stepped transmission mechanism. In a continuously variable transmission in which the driver can manually operate to perform stepped shift, the present embodiment can also be applied to a case where the rotation speed of the engine 10 increases without the driver performing an upshift operation, and the transmission controller 40 automatically executes upshift.

Various programs executed by the transmission controller 40 may be stored in a non-transitory recording medium such as a CD-ROM.

DESCRIPTION OF REFERENCE SIGNS 20 automatic transmission
2 torque converter
2a lockup clutch
2b input shaft
4 variator (transmission mechanism, continuously variable transmission mechanism)
4e output shaft
10 engine (drive source)

The present application claims a priority of Japanese Patent Application No. 2021-028935 filed with the Japan Patent Office on Feb. 25, 2021, all the contents of which are hereby incorporated by reference.

The invention claimed is:

1. An automatic transmission, comprising:
   a torque converter disposed downstream of a drive source in a power transmission path and provided with a lockup clutch; and
   a transmission mechanism disposed downstream of the torque converter and configured to change a speed ratio between an input shaft and an output shaft, wherein
   in a state where the lockup clutch is engaged, when a rotation speed of the input shaft reaches a first rotation speed, the automatic transmission starts upshift,
   in a state where the lockup clutch is disengaged or slips, when the rotation speed of the input shaft reaches a second rotation speed obtained by subtracting a first predetermined rotation speed from the first rotation speed, the automatic transmission starts upshift, and
   the first predetermined rotation speed decreases as an output torque of the drive source increases.

2. The automatic transmission according to claim 1, wherein
   the first predetermined rotation speed is a sum of an actual slip rotation speed of the lockup clutch and an excess slip rotation speed of the lockup clutch that is possible to occur before the upshift is started.

3. The automatic transmission according to claim 1, wherein
   the transmission mechanism is a continuously variable transmission mechanism that changes the speed ratio between the input shaft and the output shaft in a stepless manner,
   in the state where the lockup clutch is engaged, when the rotation speed of the input shaft reaches the first rotation speed, the automatic transmission executes upshift until the input shaft reaches a third rotation speed, and
   in the state where the lockup clutch is disengaged or slips, when the rotation speed of the input shaft reaches the second rotation speed, the automatic transmission executes upshift until the input shaft reaches the third rotation speed.

4. A control method for an automatic transmission, the automatic transmission including a torque converter disposed downstream of a drive source in a power transmission path and provided with a lockup clutch, and a transmission mechanism disposed downstream of the torque converter and configured to change a speed ratio between an input shaft and an output shaft, the method comprising:
   in a state where the lockup clutch is engaged, starting upshift when a rotation speed of the input shaft reaches a first rotation speed; and
   in a state where the lockup clutch is disengaged or slips, starting upshift when the rotation speed of the input shaft reaches a second rotation speed obtained by subtracting a first predetermined rotation speed from the first rotation speed, wherein
   the first predetermined rotation speed decreases as an output torque of the drive source increases.

5. A non-transitory computer-readable medium storing a program executable by a computer of an automatic transmission, the automatic transmission including a torque converter disposed downstream of a drive source in a power transmission path and provided with a lockup clutch, and a transmission mechanism disposed downstream of the torque converter and configured to change a speed ratio between an input shaft and an output shaft, the program causing the computer to execute:
   a procedure of, in a state where the lockup clutch is engaged, starting upshift when a rotation speed of the input shaft reaches a first rotation speed; and a procedure of, in a state where the lockup clutch is disengaged or slips, starting upshift when the rotation speed of the input shaft reaches a second rotation speed obtained by subtracting a first predetermined rotation speed from the first rotation speed, wherein
the first predetermined rotation speed decreases as an output torque of the drive source increases.

* * * * *